United States Patent
Hanya

(10) Patent No.: US 6,415,836 B1
(45) Date of Patent: Jul. 9, 2002

(54) PNEUMATIC TIRE INCLUDING AXIAL GROOVES HAVING DIFFERENT WIDTHS AND TREAD ELEMENTS HAVING DIFFERENT LENGTHS

(75) Inventor: Masahiro Hanya, Kobe (JP)

(73) Assignee: Sumitomo Rubber Industries, Ltd., Hyogo-ken (JP)

(*) Notice: Subject to any disclaimer, the term of this patent is extended or adjusted under 35 U.S.C. 154(b) by 0 days.

(21) Appl. No.: 08/974,311

(22) Filed: Nov. 19, 1997

Related U.S. Application Data

(63) Continuation-in-part of application No. 08/644,113, filed on May 10, 1996, now abandoned.

(30) Foreign Application Priority Data

May 15, 1995 (JP) .............................................. 7-115836

(51) Int. Cl.⁷ ........................ B60C 11/03; B60C 103/00; B60C 113/00
(52) U.S. Cl. .............................. 152/209.3; 152/209.18; 152/209.27; 152/903
(58) Field of Search ........................... 152/209.2, 209.3, 152/209.18, 903, 209.27

(56) References Cited

U.S. PATENT DOCUMENTS

| | | | | |
|---|---|---|---|---|
| 1,956,011 A | * | 4/1934 | Evans ..................... | 152/209 R |
| 2,878,852 A | * | 3/1959 | Lippmann et al. ....... | 152/209 R |
| 4,327,792 A | * | 5/1982 | Landers .................. | 152/209 R |
| 4,823,853 A | * | 4/1989 | Hitzky .................... | 152/209 R |
| 5,178,698 A | * | 1/1993 | Shibata ................... | 152/209 R |
| 5,205,879 A | * | 4/1993 | Seitz et al. .............. | 152/209 R |
| 5,308,416 A | * | 5/1994 | Baumhofer et al. ... | 152/209.27 |
| 5,353,855 A | * | 10/1994 | Kajiwara et al. ....... | 152/209 R |
| 5,435,364 A | * | 7/1995 | Hasegawa et al. ..... | 152/209.18 |
| 5,618,360 A | * | 4/1997 | Sakuno .................... | 152/209.3 |
| 5,628,843 A | * | 5/1997 | Hanya ..................... | 152/209.3 |
| 5,766,383 A | * | 6/1998 | Hasegawa et al. .......... | 152/903 |

FOREIGN PATENT DOCUMENTS

| | | | |
|---|---|---|---|
| DE | 3522967 | | 1/1987 |
| EP | 0367557 | | 5/1990 |
| EP | 0454659 | | 10/1991 |
| EP | 493063 | * | 7/1992 |
| EP | 0495619 | | 7/1992 |
| EP | 0591002 | | 4/1994 |
| JP | 58-22364 | * | 5/1983 |
| JP | 6-297916 | * | 10/1994 ............. 152/209 R |

OTHER PUBLICATIONS

Translation for Japan 6–297916.
Patent Abstracts of Japan, vol. 94, no. 010 & JP–A–06 297916; Oct. 25, 1994.

* cited by examiner

Primary Examiner—Steven D. Maki
(74) Attorney, Agent, or Firm—Birch, Stewart, Kolasch & Birch, LLP

(57) ABSTRACT

A pneumatic tire having an improved tread pattern which is capable of improving the steering stability, tire uniformity and the like without increasing a tread pattern noise is disclosed. The tire comprises rows of circumferentially arranged tread elements such as blocks, the tread elements in each row having plural kinds of different circumferential widths. The circumferential widths of the axial grooves and the circumferential lengths of the tread elements in each row satisfy $1.2 \leq GR/BR \leq 1.5$ where BR is the length maximum ratio defined by the ratio (Bll/Bss) of the maximum circumferential length (Bll) to the minimum circumferential length (Bss), and GR is the width maximum ratio defined by the ratio (Gll/Gss) of the maximum circumferential width (Gll) to the minimum circumferential width (Gss).

14 Claims, 3 Drawing Sheets

PNEUMATIC TIRE INCLUDING AXIAL GROOVES HAVING DIFFERENT WIDTHS AND TREAD ELEMENTS HAVING DIFFERENT LENGTHS

This application is a continuation-in-past, of application Ser. No. 08/644,113 filed on May 10, 1996, now abandoned.

The present invention relates to a pneumatic tire, more particularly an improved tread pattern which is capable of improving the steering stability, tire uniformity and the like without increasing a tread pattern noise.

BACKGROUND OF THE INVENTION

In the pneumatic tires provided in the tread portion with blocks, lugs and the like (hereinafter tread elements) arranged circumferentially at a constant pitch, a large pattern noise at a specific frequency is liable to occur during running.

In order to reduce such a pattern noise at a specific frequency, there have been proposed, for example in JP-A-2-127103, the so-called variable pitching methods, which disperse the noise into a wide frequency range by, for example, using plural kinds of blocks having different circumferential lengths, or changing the circumferential widths of axial grooves, and thus prevents a resonance. In those variable pitching methods, in order to derive a noise reducing effect effectively therefrom, the maximum pitch ratio, that is, the ratio (b/a) of the maximum length (b) to minimum length (a) of the tread elements must be set at a large value. Accordingly, the rigidity of the tread elements becomes inevitably uneven. As a result, the steering stability is decreased, and the tractive force variation increases and the tire uniformity is deteriorated.

SUMMARY OF THE INVENTION

It is therefore, an object of the present invention to provide a pneumatic tire in which the pattern noise is effectively improved without decreasing the steering stability, tire uniformity and the like.

According to one aspect of the present invention, a pneumatic tire comprises rows of circumferentially arranged tread elements, the tread elements in each row having plural kinds of different circumferential lengths, axial grooves circumferentially dividing the tread elements in said each row having plural kinds of different circumferential widths, the circumferential widths of each such axial grooves being generally constant along the length thereof.

the circumferential widths of the axial grooves and the circumferential lengths of the tread elements in each row satisfying $$1.2 \neq \leq GR/BR \neq \leq 1.5$$

where

BR is the length maximum ratio defined by the ratio (Bll/Bss) of the maximum circumferential length (Bll) to the minimum circumferential length (Bss), and GR is the width maximum ratio defined by the ratio (Gll/Gss) of the maximum circumferential width (Gll) to the minimum circumferential width (Gss).

In each row, preferably, the number of the different circumferential lengths of the tread elements is equal to the number of the different circumferential widths of the axial grooves.

As to the sequence of the tread elements in each row, preferably, the circumferential lengths are arranged in the ascending and descending order.

Further, the sequence of the axial grooves is such that each of the circumferential widths is adjacent to one of the circumferential lengths having the same order as the width, whereby the circumferential widths are arranged in the ascending and descending order. In other words, the circumferential widths are respectively located on the same side of the circumferential lengths of the same order, wherein the "same side" is in the circumferential direction, and means, for example, the front side or rear side.

BRIEF DESCRIPTION OF THE DRAWINGS

An embodiment of the present invention will now be explained according to the accompanying drawings.

DETAILED DESCRIPTION OF THE INVENTION

Figure 1:
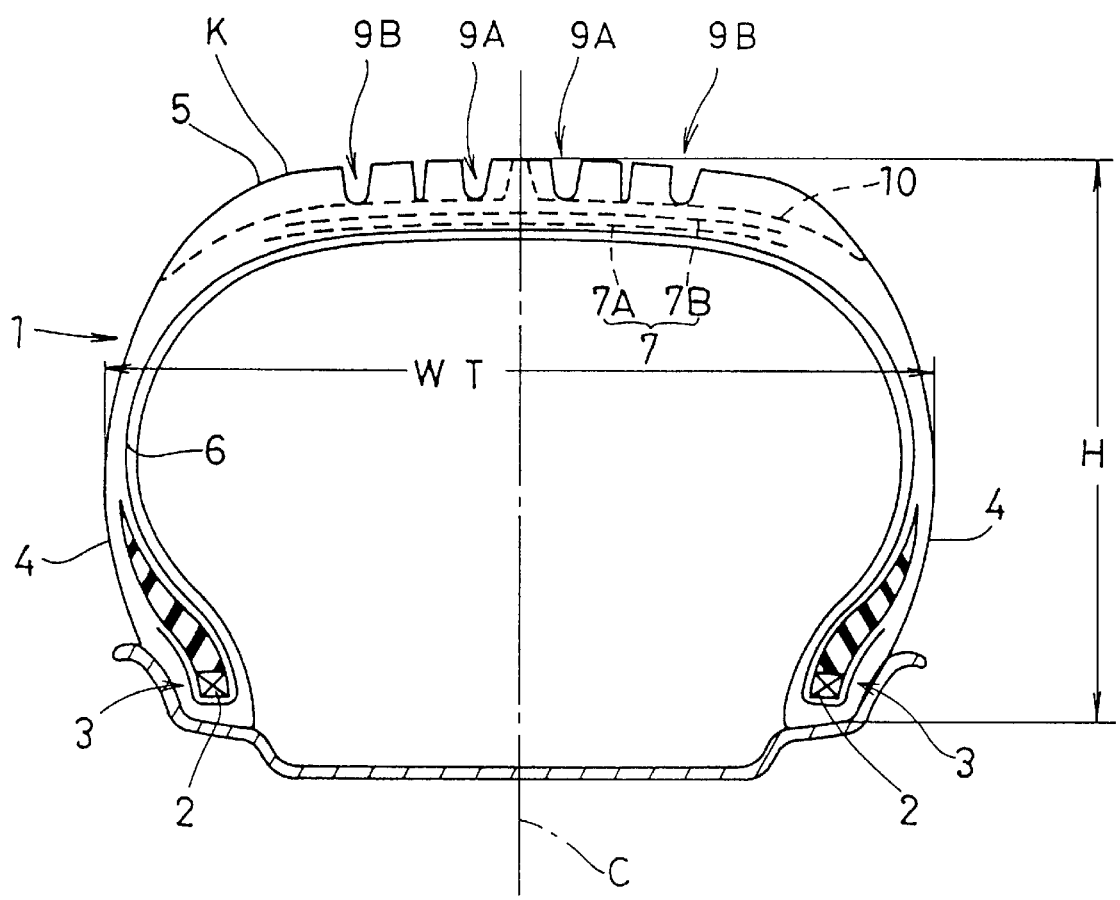
FIG. 1 is a cross sectional view a pneumatic tire showing an embodiment of the present invention.

In FIG. 1, the pneumatic tire 1 is a low aspect ratio passenger tire.

The aspect ratio, which is the ratio H/WT of the tire section height H to the maximum tire width WT, is not more than 80%, preferably not more than 60%.

The tire 1 comprises a tread portion 5, a pair of sidewall portions 4, a pair of bead portions 3 with a bead core 2 therein, a carcass 6 extended between the bead portions 3 though the tread portion 5 and sidewall portions 4 and turned up around the bead cores 2 to be secured thereto, and a stiff belt 7 disposed radially outside the carcass 6 and inside the tread portion 5.

The carcass 6 comprises at least one ply of cords arranged radially at an angle of from 90 to 60 degrees with respect to the tire equator C to have the so called radial or semi-radial ply structure. For the carcass cords, organic fiber cords such as polyester, nylon, rayon and the like and steel cords can be used.

The belt 7 comprises one or more, in this embodiment two plies 7A and 7B of parallel cords laid at an angle of not more than 30 degrees with respect to the tire equator C. The cords in each ply are oriented to cross the cords in the next ply. For the belt cords, metal cords. e.g. steel and the like and organic fiber cords, e.g. aramid, nylon, polyester, rayon and the like similarly to the carcass cords can be used.

The tread portion 5 is provided with a tread pattern comprising at least one row of circumferentially arranged tread elements, for example the so called blocks pattern or block-rib pattern. The tread elements are divided in the tire circumferential direction by axial grooves.

Figure 2:
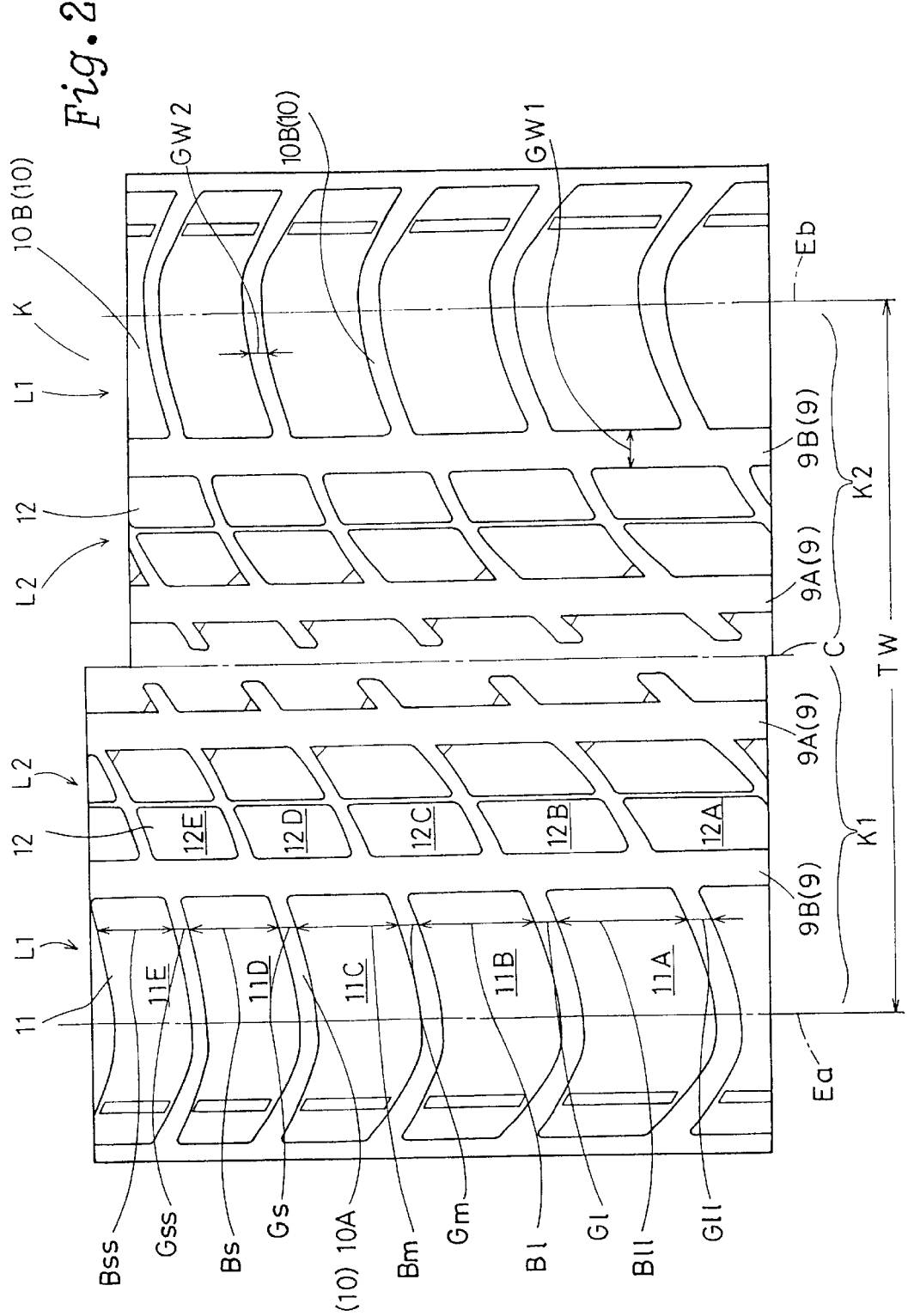
FIG. 2 is a developed plan view showing an example of the tread pattern.

In this embodiment, as shown in FIG. 2, the tread portion 5 is provided in the ground contacting width TW with tread grooves comprising circumferential grooves 9 extending circumferentially of the tire and axial grooves 10 extending axially of the tire to intersect the circumferential grooves 9.

The circumferential grooves 9 in this embodiment comprise a pair of axially inner circumferential grooves 9A, each disposed in each side of the tire equator C, and a pair of axially outer circumferential grooves 9B, each disposed axially outside of one of the inner circumferential grooves 9A.

The axial grooves 10 in this embodiment comprise right axial grooves 10B extending axially inwardly from the right tread edge Eb and left axial grooves 10A extending axially inwardly from the left tread edge Ea. All the axial grooves 10 terminate near but before the tire equator C.

In the tread portion, therefore, two rows L1 of shoulder blocks 11, two rows L2 of middle blocks 12, and one circumferentially continuously extending center rib are formed.

Here, the circumferential grooves 9 are grooves having a width GW1 of not less than 5 mm and not less than 3% of the tread width TW at the tread face K.

In this example, the depth of all the circumferential grooves 9 is substantially constant along the entire length, and all the circumferential grooves 9 are straight.

The depth of all the axial grooves 10 is substantially constant.

However, zigzag or wavy configurations can be used for the circumferential grooves 9 in stead of the straight grooves. The axial grooves may be terminated near but slightly beyond the tire equator C, maintaining the continuity of the center rib in the circumferential direction. Further, it is possible to connect the right grooves 10B to the left grooves 10A at the tire equator C to form axial grooves extending continuously from one tread edge Ea to the other tread edge Eb.

The tread pattern in this embodiment is the so-called symmetrical pattern, that is, a non-directional pattern, and blocks 11, 12 in each row L1, L2 have five different circumferential widths Gll, Gl, Gm, Gs and Gss.

$$Gll > Gl > Gm > Gs > Gss$$

In FIG. 2, the circumferential lengths of the blocks and the circumferential widths of the axial grooves are somewhat exaggerated.

In each row L1, L2, the sequence of the five different circumferential lengths in the tire circumferential direction are $$Bll, Bl, Bm, Bs, Bss$$

and the sequence of the five different circumferential widths in the tire circumferential direction are $$Gll, Gl, Gm, Gs, Gss.$$

The relative circumferential positions thereof are such that the widths are respectively disposed next to the lengths having the same ranking or order as the width. For example, as shown in FIG. 2, in the left side row L1, the widths Gll, Gl, Gm, Gs, Gss are located on the underside of the lengths Bll, Bl, Bm, Bs, Bss, respectively, but on the upside in the right side row L1.

When the entire circumference of the tire is considered, the sequence of the circumferential lengths is such that a gradual increase and a gradual decrease are repeated alternately as follow.

| Bm | B1 | B11 | B1 | Bm | Bs | Bss | Bs | Bm | B1 | B11 | B1 |
|----|----|-----|----|----|----|-----|----|----|----|-----|----|
| < | < | > | > | > | > | < | < | < | < | > | | the phase in a right tread half K2 is shifted with respect to the phase in a left tread half K1. Thus, the following description will be made mainly on one tread half for convenience sake.

And the differences in length between the circumferentially adjacent blocks are generally constant as above-described. Thus, the sequence of the circumferential widths is as follow.

| Gm | G1 | G11 | G1 | Gm | Gs | Gss | Gs | Gm | G1 | G11 | G1 |
|----|----|-----|----|----|----|-----|----|----|----|-----|----|
| < | < | > | > | > | > | < | < | < | < | > | |

The tread elements in each row, that is, the blocks 11 and 12 have three to five different circumferential lengths. In this embodiment, the shoulder blocks 11A to 11E in each row L1, and the middle blocks 12A to 12E in each row L2 have five different lengths Bll, Bl, Bm, Bs and Bss.

$$Bll > Bl > Bm > Bs > Bss$$

The axial grooves which circumferentially divide the tread elements in each row also have different circumferential widths GW2, of which the number is the same as that of the circumferential lengths of the tread elements in the same row. Each of circumferential widths GW2 of the axial grooves in each row is generally constant along the length thereof, generally constant being defined as a predetermined width plus or minus 15% of the predetermined width of such axial groove.

To be exact in this embodiment, the part of the axial grooves 10A (or 10B) which circumferentially divide the As to the sequence of the tread elements or blocks in a row, it is not preferable that the maximum length (Bll) and the minimum length (Bss) are disposed circumferentially adjacent to each other. It is however, possible to dispose the lengths differed from each other by two ranking can be disposed circumferentially adjacent to each other. For example, (Bll and Bm), (Bl and Bs), (Bm and Bss). It is also possible to dispose the blocks having the same length adjacently to each other.

In the blocks 11A to 11E in each row Ll, the length maximum ratio (BR) is set in the range of from 1.1 to 1.5, preferably in the range of 1.15 to 1.25, wherein the length maximum ratio (BR) is the ratio (Bll/Bss) of the maximum circumferential length (Bll) of the longest blocks 11A to the minimum circumferential length (Bss) of the shortest blocks 11E.

If the length maximum ratio (BR) is less than 1.1, it becomes difficult to reduce the pattern noise. If the length maximum ratio (BR) is more than 1.5, the blocks 11 becomes uneven in the rigidity, and the tire uniformity is degraded. Further, the steering stability is liable to be deteriorated.

Further, the differences in length between the adjacent blocks are preferably evened as explained above. However, overall, the rows may have different average widths for the circumferential rows thereof such that the average width of the axially outer row is greater than the average width of the axially inner row. FIG. 2 illustrates such average width in the rows L1 of shoulder blocks 11 is larger than the average width in the rows L2 of middle blocks 12.

Further, in the axial grooves 10A, the ratio (GR/BR) is set in the range of 1.2 to 1.5, wherein GR is the width maximum ratio (GR) defined as the ratio (Gll/Gss) of the maximum circumferential width (Gll) of the widest axial grooves to the minimum circumferential width (Gss) of the narrowest axial grooves.

In the same manner as the lengths of the blocks, the differences in circumferential width between the adjacent axial grooves in each block row are evened.

The above-explanation is on the row L1, but the row L2 is also constructed in the same manner as L1. In this embodiment, therefore, all the rows L1, L2, L2, L1 are constructed as explained above because the pattern is symetrical.

As to the relationship between the axially adjacent rows L1 and L2, as shown in FIG. 2, the sequences of the blocks are the same but shifted with respect to each other by one ranking or one order in the circumferential direction of the tire.

Figure 3:
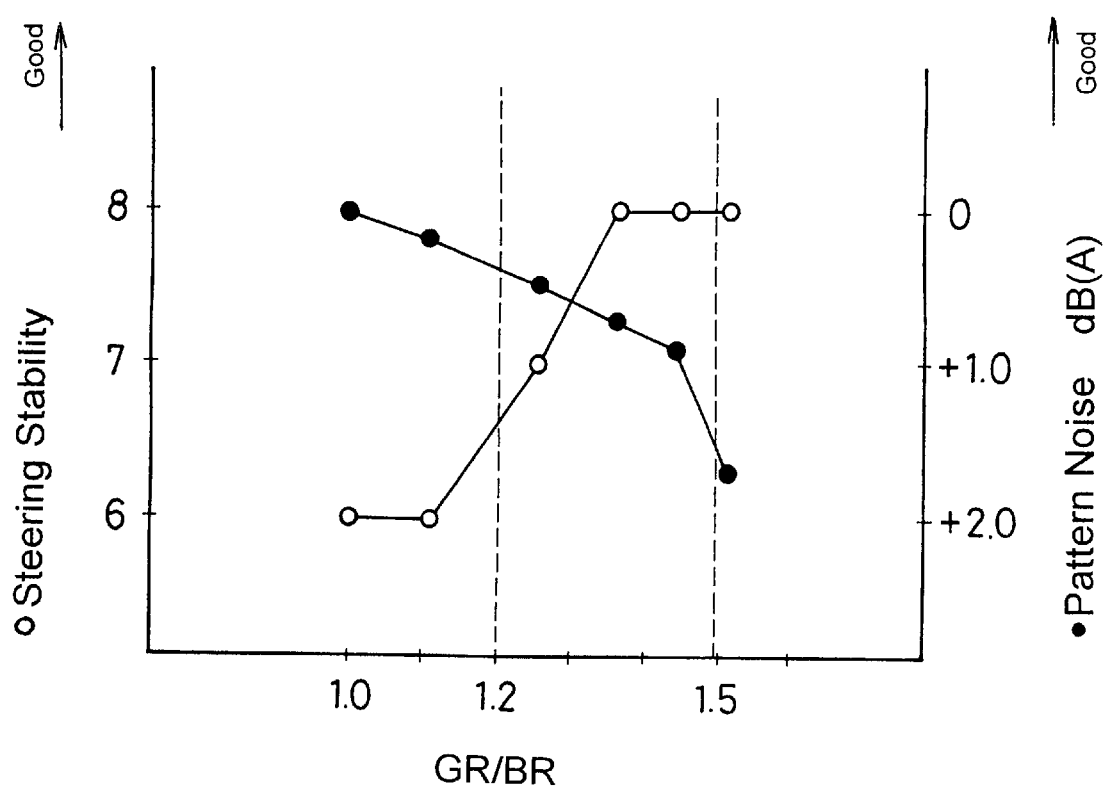
FIG. 3 is a diagram showing a relationship between the ratio (GR/BR) and steering stability and pattern noise.

FIG. 3 shows relationships between the ratio (GR/BR) and steering stability and pattern noise. The steering stability was evaluated into ten ranks, and the pattern noise is indicated in dB as the difference from the value when (GR/BR)=1.

When the ratio (GR/BR) exceeds about 1.2, the block rigidity is evened and the steering stability is remarkably improved. However, as the ratio reaches 1.5, the steering stability also reaches its limit.

When the ratio (GR/BR) is less than about 1.5, the pattern noise is reduced. However, when the ratio exceeds 1.5, the block length variation becomes too small, and the pattern noise can not be reduced.

When the ratio (GR/BR) is in the range of 1.2 to 1.5, the tire uniformity is maintained within a normal level.

Incidentally, the circumferential lengths of the blocks and the circumferentially widths of the axial grooves in each row are measured at the same axial position, that is, in a section parallel to the tire equatorial plane.

Test tires having a size 205/60R15 were made and tested for the following performances. The test tires had the tread pattern shown in FIG. 1 having five block lengths Bll, Bl, Bm, Bs, Bss and five groove widths Gll, Gl, Gm, Gs, Gss. (Bm=23.41 mm, Gm=4.68 mm) The specifications are given in Table 1.

A) Pattern Noise Test

A 2500 cc RW car provided on the front and rear axles with the test tires was run on a smooth road surface at a speed of 80 km/h, and the overall noise level dB(A) was measured near one of the driver's ears located on the outside of the car. All the four tires were mounted on a standard size 15X6-JJ aluminum rim wheel and inflated to 200 Kpa. The measured noise level is shown Table 1 as the difference from the conventional tire.

B) Road Noise Test

The same test car was run on a dry rough asphalt road surface, and the overall noise level dB(A) during running at a constant speed of 50 km/h was measured with a road noise meter. The measured noise level is shown Table 1 as the difference from the conventional tire.

C) Tire Uniformity Test

Using a cornering tester, the tractive force variation (TFV) of the test tire was measured at a speed of 80 km/h. The difference from the conventional tire is shown in Table 1. The smaller the difference, the better the tire uniformity.

D) Dry and Wet Steering Stability Test and Ride Comfort Test

In the same condition as the above-mentioned pattern noise test, the test car was run on a dry and wet asphalt road surface in a test course, and the driver evaluated the performances into ten ranks based on that the conventional tire is rank six (standard). The higher the rank, the better performance. Here, rank eight means a remarkably good level.

TABLE 1

| Tire | Conv. | Ex. 1 | Ex. 2 | Ex. 3 | Ref. 1 | Ref. 2 |
|---|---|---|---|---|---|---|
| Gll/Gm | 1.25 | 1.25 | 1.25 | 1.25 | 1.25 | 1.25 |
| Gss/Gm | 0.75 | 0.75 | 0.75 | 0.75 | 0.75 | 0.75 |
| GR | 1.67 | 1.67 | 1.67 | 1.67 | 1.67 | 1.67 |
| Bll/Bm | 1.25 | 1.10 | 1.20 | 1.05 | 1.20 | 1.05 |
| Bss/Bm | 0.75 | 0.90 | 0.90 | 0.90 | 0.80 | 0.95 |
| BR | 1.67 | 1.22 | 1.33 | 1.17 | 1.50 | 1.11 |
| GR/BR | 1.00 | 1.36 | 1.25 | 1.43 | 1.11 | 1.51 |
| Pattern noise dB (A) | 0 | +0.7 | +0.5 | +0.9 | +0.2 | +1.7 |
| Road noise dB (A) | 0 | 0 | 0 | 0 | 0 | 0 |
| TFV (kgf) | 0 | −5.4 | −4.1 | −6.0 | −0.4 | −6.9 |
| Steering stability (DRY) | 6 | 8 | 7 | 8 | 6 | 8 |
| Steering stability (WET) | 6 | 8 | 7 | 8 | 6 | 8 |
| Ride comfort | 6 | 6 | 6 | 6 | 6 | 6 |

From the test results, it was confirmed that the Example tires 1 to 3 shows a tendency to increase the pattern noise as the block length maximum ratio (BR) decreases, but the noise level can be maintained in a reduced low level, while improving the steering stability.

It is remarkable that the steering stability is improved up to rank 8.

In the reference tire 1, as the ratio (GR/BR) was small, the steering stability could not be improved.

In the reference tire 2, the steering stability could be increased, but the pattern noise could not be reduced.

Further, changing the number of the block lengths and grove widths, test tires having the same size of 205/60R15 were made and the same tests were conducted. The tread pattern was similar to that shown in FIG. 1, but the block lengths Bll, Bm, Bss were decreased to three, and the groove widths Gll, Gm, Gss were also decreased to three. (Bm= 23.41 mm, Gm=4.68 mm) The specifications are given in Table 2.

TABLE 2

| Tire | Conv. | Ex. 4 | Ex. 5 | Ref. 3 | Ref. 4 |
|---|---|---|---|---|---|
| Gll/Gm | 1.15 | 1.20 | 1.25 | 1.25 | 1.15 |
| Gss/Gm | 0.85 | 0.80 | 0.75 | 0.75 | 0.85 |
| GR | 1.35 | 1.50 | 1.67 | 1.67 | 1.35 |
| Bll/Bm | 1.15 | 1.10 | 1.10 | 1.05 | 1.10 |
| Bss/Bm | 0.85 | 0.90 | 0.90 | 0.95 | 0.90 |
| BR | 1.35 | 1.22 | 1.22 | 1.11 | 1.22 |
| GR/BR | 1.00 | 1.23 | 1.37 | 1.50 | 1.11 |
| Pattern noise dB (A) | 0 | +0.7 | +0.3 | +1.8 | +1.4 |
| Road noise dB (A) | 0 | 0 | 0 | 0 | 0 |
| TFV (kgf) | 0 | −5.8 | −5.5 | −7.5 | −5.9 |

TABLE 2-continued

| Tire | Conv. | Ex. 4 | Ex. 5 | Ref. 3 | Ref. 4 |
| --- | --- | --- | --- | --- | --- |
| Steering stability (DRY) | 6 | 8 | 7 | 8 | 8 |
| Steering stability (WET) | 6 | 8 | 7 | 7 | 8 |
| Ride comfort | 6 | 6 | 6 | 6 | 6 |

It was also confirmed through the tests that the example tires 4 and 5 according to the present invention are superior to the conventional tire and reference tires 3 and 4.

As described above, the pneumatic tires according to the present invention can be improved in the steering stability, tire uniformity and the like, while reducing the the pattern noise.

What is claimed is:

1. A pneumatic tire comprising
   a plurality of rows of circumferentially arranged tread elements including two shoulder rows and two middle rows adjacent to the tire equator,
   each said row being spaced from an adjacent row by a circumferential groove,
   the tread elements in each said row circumferentially divided by axial grooves and having a plurality of different circumferential lengths,
   in each said row, said axial grooves having a plurality of different circumferential widths each being generally constant along the length of the axial groove,
   the circumferential widths of the axial grooves and the circumferential lengths of the tread elements in each said row satisfying $$1.2 \leftarrow GR/BR < 1.5$$

where
   BR is the length maximum ratio defined by the ratio (Bll/Bss) of the maximum circumferential length (Bll) of said plurality of circumferential lengths to the minimum circumferential length (Bss) of said plurality of circumferential lengths, and
   GR is the width maximum ratio defined by the ratio (Gll/Gss) of the maximum circumferential width (Gll) of said plurality of circumferential widths to the minimum circumferential width (Gss) of said plurality of circumferential widths, and
   the average width of the axial grooves in said shoulder rows being larger than the average width of the axial grooves in said middle rows.

2. The pneumatic tire according to claim 1, wherein in each said row, the number of said plurality of circumferential lengths of the tread elements is equal to the number of said plurality of circumferential widths of the axial grooves, and said plurality of circumferential lengths and said plurality of circumferential widths are arranged in the circumferential direction in a first sequence of ascending lengths and a first sequence of ascending widths, respectively, and in a second sequence of descending lengths and a second sequence of descending widths, respectively, said first and second sequences of said circumferential lengths alternating in the circumferential direction, and said first and second sequences of said circumferential widths alternating in the circumferential direction.

3. The pneumatic tire according to claim 2, wherein said plurality of circumferential widths of the axial grooves are interleaved with said plurality of circumferential lengths of the tread elements such that a first width of said first sequence of ascending widths is disposed adjacent to a first end of a first length of said first sequence of ascending lengths and said widths of said first sequence of ascending widths are arranged in the same order as said lengths of said first sequence of ascending lengths.

4. The pneumatic tire according to claim 1, wherein each of said plurality of circumferential widths of the axial grooves in said plurality of rows of circumferentially arranged tread elements is generally constant along the axial length thereof at the tread surface.

5. The pneumatic tire according to claim 1, wherein said plurality of circumferential widths of the axial grooves and said plurality of circumferential lengths of the tread elements have a same number of different lengths and different widths, and the number is in a range of 3 to 5.

6. The pneumatic tire according to the claim 1, wherein each said circumferential groove is straight.

7. The pneumatic tire according to claim 1, wherein each said circumferential groove is straight and has a width of not less than 5 mm and not less than 3% of the tread width at the tread face.

8. The pneumatic tire according to claim 1, wherein said axial grooves in each said row are substantially parallel with each other.

9. The pneumatic tire according to claim 1, wherein said axial grooves in each said row are inclined towards the same direction.

10. The pneumatic tire according to claim 1, wherein the axial grooves in the shoulder rows and middle rows are inclined towards the same direction.

11. The pneumatic tire according to claim 1, wherein the length maximum ratio BR satisfies $1.15 \leftarrow BR \leftarrow 1.25$.

12. A pneumatic tire comprising
    a plurality of rows of circumferentially arranged tread elements,
    each said row being spaced from an adjacent row by a circumferential groove,
    the tread elements in each said row being divided by axial grooves so as to have a plurality of different circumferential lengths,
    in each said row, said axial grooves having a plurality of different circumferential widths each being generally constant along the length of the axial groove,
    the circumferential widths of the axial grooves and the circumferential lengths of the tread elements in each said row satisfying $1.2 \leq GR/BR < 1.5$
    where BR is the length maximum ratio defined by the ratio (Bll/Bss) of the maximum circumferential length (Bll) of said plurality of circumferential lengths to the minimum circumferential length (Bss) of said plurality of circumferential lengths, and
    GR is the width maximum ratio defined by the ratio (Gll/Gss) of the maximum circumferential width (Gll) of said plurality of circumferential widths to the minimum circumferential width (Gss) of said plurality of circumferential widths, and
    in each said row,
    said plurality of different circumferential lengths being arranged in the circumferential direction to repeat a gradual increase and a gradual decrease, and
    said plurality of different circumferential widths being arranged in the circumferential direction to repeat a gradual increase and a gradual decrease, in each said row, the number of the different circumferential lengths of the tread elements being equal to the number of the different circumferential widths of the axial grooves, and the circumferential lengths and the circumferential widths are arranged in the circumferential direction while alternately repeating an ascending order and a descending order and said plurality of circumferential widths of the axial grooves are interleaved with said plurality of circumferential lengths of the tread elements such that a first width of a first sequence of ascending widths is disposed adjacent to a first end of a first length of a first sequence of ascending lengths and said widths of said first sequence of ascending widths are arranged in the same order as said lengths of said first sequence of ascending lengths.

13. The pneumatic tire according to claim 12, wherein each said circumferential groove is straight.

14. The pneumatic tire according to claim 12, wherein the length maximum ratio BR satisfies $1.15 \leftarrow BR \leftarrow 1.25$.

* * * * *